US008232983B2

(12) United States Patent
Ogawa et al.

(10) Patent No.: US 8,232,983 B2
(45) Date of Patent: Jul. 31, 2012

(54) METHOD FOR DRIVING PLASMA DISPLAY PANEL, AND PLASMA DISPLAY DEVICE

(75) Inventors: Kenji Ogawa, Osaka (JP); Keiji Akamatsu, Osaka (JP); Yasuhiro Arai, Osaka (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 12/515,349

(22) PCT Filed: Mar. 27, 2008

(86) PCT No.: PCT/JP2008/000751

§ 371 (c)(1),
(2), (4) Date: May 18, 2009

(87) PCT Pub. No.: WO2008/117540

PCT Pub. Date: Oct. 2, 2008

(65) Prior Publication Data

US 2010/0033454 A1 Feb. 11, 2010

(30) Foreign Application Priority Data

Mar. 28, 2007 (JP) ................................ 2007-083720

(51) Int. Cl.
*G06F 3/038* (2006.01)
*G09G 3/28* (2006.01)
*G09G 3/00* (2006.01)
*G09G 1/06* (2006.01)

(52) U.S. Cl. ............... 345/204; 345/60; 345/30; 345/10

(58) Field of Classification Search .................. 345/204
See application file for complete search history.

(56) References Cited

U.S. PATENT DOCUMENTS

| | | | | |
|---|---|---|---|---|
| 6,066,923 | A | 5/2000 | Noborio et al. | |
| 6,140,984 | A | 10/2000 | Kanazawa et al. | |
| 7,023,403 | B2 | 4/2006 | Setoguchi et al. | |
| 2002/0020674 | A1 * | 2/2002 | Izawa | 210/723 |

(Continued)

FOREIGN PATENT DOCUMENTS

JP 9-311661 A 12/1997

(Continued)

OTHER PUBLICATIONS

International Search Report for PCT/JP2008/000751, May 1, 2008.

(Continued)

*Primary Examiner* — Alexander S Beck
*Assistant Examiner* — Kirk Hermann
(74) *Attorney, Agent, or Firm* — RatnerPrestia

(57) ABSTRACT

In the method for driving a plasma display panel and the plasma display device, the scan electrodes of the plasma display panel are divided into two scan electrode groups, the address period of subfields is divided into two address periods corresponding to the two scan electrode groups, and at least in one address period, the scan electrodes belonging to the scan electrode group provided with scan pulses are sequentially provided with scan pulses shifting from second voltage higher than scan pulse voltage to scan pulse voltage and shifting again to second voltage, and the scan electrodes belonging to the scan electrode group not provided with scan pulses are provided with either third voltage higher than scan pulse voltage or fourth voltage higher than second voltage and third voltage, and with third voltage at least while scan pulse voltage is applied to adjacent scan electrodes.

4 Claims, 9 Drawing Sheets

U.S. PATENT DOCUMENTS

| | | | | |
|---|---|---|---|---|
| 2002/0097200 | A1* | 7/2002 | Setoguchi et al. | 345/60 |
| 2006/0119544 | A1 | 6/2006 | Setoguchi et al. | |

FOREIGN PATENT DOCUMENTS

| | | | |
|---|---|---|---|
| JP | 09-311661 | A | 12/1997 |
| JP | 11-095717 | A | 4/1999 |
| JP | 11-95717 | A | 4/1999 |
| JP | 2002-215088 | A | 7/2002 |
| JP | 2003-43989 | A | 2/2003 |
| JP | 2007-65671 | A | 3/2007 |

OTHER PUBLICATIONS

South Korea Office Action, Dec. 10, 2010, Panasonic Corporation.

* cited by examiner

METHOD FOR DRIVING PLASMA DISPLAY PANEL, AND PLASMA DISPLAY DEVICE

This application is a U.S. National Phase Application of PCT International Application PCT/JP2008/000751.

TECHNICAL FIELD

The present invention relates to a method for driving plasma display panel, and a plasma display device.

BACKGROUND ART

An AC surface discharge panel as a representative example of plasma display panel (or panel) is formed of multiple discharge cells provided between front substrate and rear substrate disposed oppositely.

On the front substrate, a display electrode pair composed of scan electrode and sustain electrode is formed in a plurality of pairs mutually parallel on the front glass substrate, and on the rear substrate, a plurality of data electrodes are formed parallel on the rear glass substrate. The front substrate and the rear substrate are disposed oppositely and sealed so that the display electrode pair and the data electrode may intersect, and the internal discharge space is packed with discharge gas. Discharge cells are formed in the confronting portions of the display electrode pair and the data electrode.

As a method of driving a panel, generally, a so-called subfield method is used, that is, one field period is divided into a plurality of subfields, and the gradation is displayed by combination of subfields for emitting light. Each subfield has an initializing period, an address period, and a sustain period. In the initializing period, initializing discharge is generated, and a wall charge necessary for subsequent address operation is formed on each electrode. In the address period, a scan pulse is sequentially applied to each scan electrode, and an address pulse is applied selectively to the data electrode of the discharge cell for display, and address discharge is generated. In the sustain period, sustain pulses are alternately applied to a display electrode pair, and sustain discharge is generated in the discharge cell causing address discharge to emit light, and thereby an image is displayed.

The subfield method includes various driving methods deviated in the timing of generation of address discharge in individual scan electrode groups by dividing the scan electrode into a plurality of scan electrode groups. For example, patent document 1 discloses a driving method in which relatively lower voltages are applied to second scan electrode groups as second voltages, while scan pulses are applied to first san electrode groups, and then set-down pulses to fall gradually to third voltages are applied. However, while scan pulses are applied to one scan electrode group, when lower voltages are applied to other scan electrode groups, the wall charge required for the address operation is decreased in the scan electrode groups provided with lower voltages, and normal address discharge may not be generated.

However, when driving the panel by using the subfield method, only by applying address pulses to data electrodes, if scan pulses are not applied to scan electrodes, the wall charge required for the address operation may be decreased, and normal address discharge may not be generated. To solve this problem, for example, patent document 2 discloses a driving method in which the scan electrode is divided into four scan electrode groups, the address period is divided into four periods for applying scan pulses sequentially to the scan electrodes belonging to each scan electrode group, and higher voltages are applied to the scan electrode groups not provided with scan pulses than in the scan electrode groups provided with scan pulses.

In this driving method, however, the voltage difference of adjacent scan electrodes may be excessive at a certain timing, and sparks may be generated between panel electrode terminals or wiring patterns of printed wiring board. There is also possibility of occurrence of shorting in the scan electrode drawing-out portions of the panel due to migration. Besides, since a driving voltage is applied from the scan electrode driving circuits corresponding to the individual scan electrode groups, a slight difference may be caused in the driving voltage waveform in every scan electrode group, and a contour may be formed in the image display region corresponding to the boundary of the scan electrode groups, which may lead to lowering of image display quality.

[Patent document 1] Japanese Unexamined Patent Publication No. 2007-65671

[Patent document 2] Japanese Unexamined Patent Publication No. 2003-43989

DISCLOSURE OF THE INVENTION

The present invention presents a method for driving a panel and a plasma display device capable of generating stable address discharge while preventing decrease of wall charge without causing spark or shorting and without lowering the image display quality.

The driving method of plasma display panel is a driving method of plasma display panel having a plurality of scan electrodes, a plurality of sustain electrodes, and a plurality of data electrodes, in which the plurality of scan electrodes are divided into a first scan electrode group and a second scan electrode group, one field period is composed of a plurality of subfields having a first address period for applying scan pulses sequentially to the scan electrodes belonging to the first scan electrode group, and a second address period for applying scan pulses sequentially to the scan electrodes belonging to the second scan electrode group, and at least in one of the first address period and the second address period, on the scan electrodes belonging to the scan electrode group to which scan pulses are applied, scan pulses shifting from a second voltage higher than the scan pulse voltage to the scan pulse voltage and shifting again to the second voltage are applied, and on the scan electrodes belonging to the scan electrode group to which scan pulses are not applied, either one of a third voltage higher than the scan pulse voltage and the fourth voltage higher than the second voltage and the third voltage is applied, and the third voltage is applied while the scan pulse voltage is applied to at least the adjacent scan electrodes.

The plasma display device includes a plasma display panel having a plurality of scan electrodes, a plurality of sustain electrodes, and a plurality of data electrodes, and a scan electrode driving circuit in which the plurality of scan electrodes are divided into a first scan electrode group and a second scan electrode group, scan pulses are sequentially applied individually to the scan electrodes belonging to the first scan electrode group in first address period of subfields for composing one field period, and scan pulses are sequentially applied individually to the scan electrodes belonging to the second scan electrode group in second address period, and the scan electrode driving circuit, at least in one of the first address period and the second address period, applies on the scan electrodes belonging to the scan electrode group to which scan pulses are applied, scan pulses shifting from a second voltage higher than the scan pulse voltage to the scan pulse voltage and shifting again to the second voltage are applied, and applies on the scan electrodes belonging to the scan electrode group to which scan pulses are not applied, either one of a third voltage higher than the scan pulse voltage and a fourth voltage higher than the second voltage and the third voltage is applied, and applies the third voltage while the scan pulse voltage is applied to at least the adjacent scan electrodes.

DESCRIPTION OF THE REFERENCE NUMERALS AND SIGNS

Figure 1:
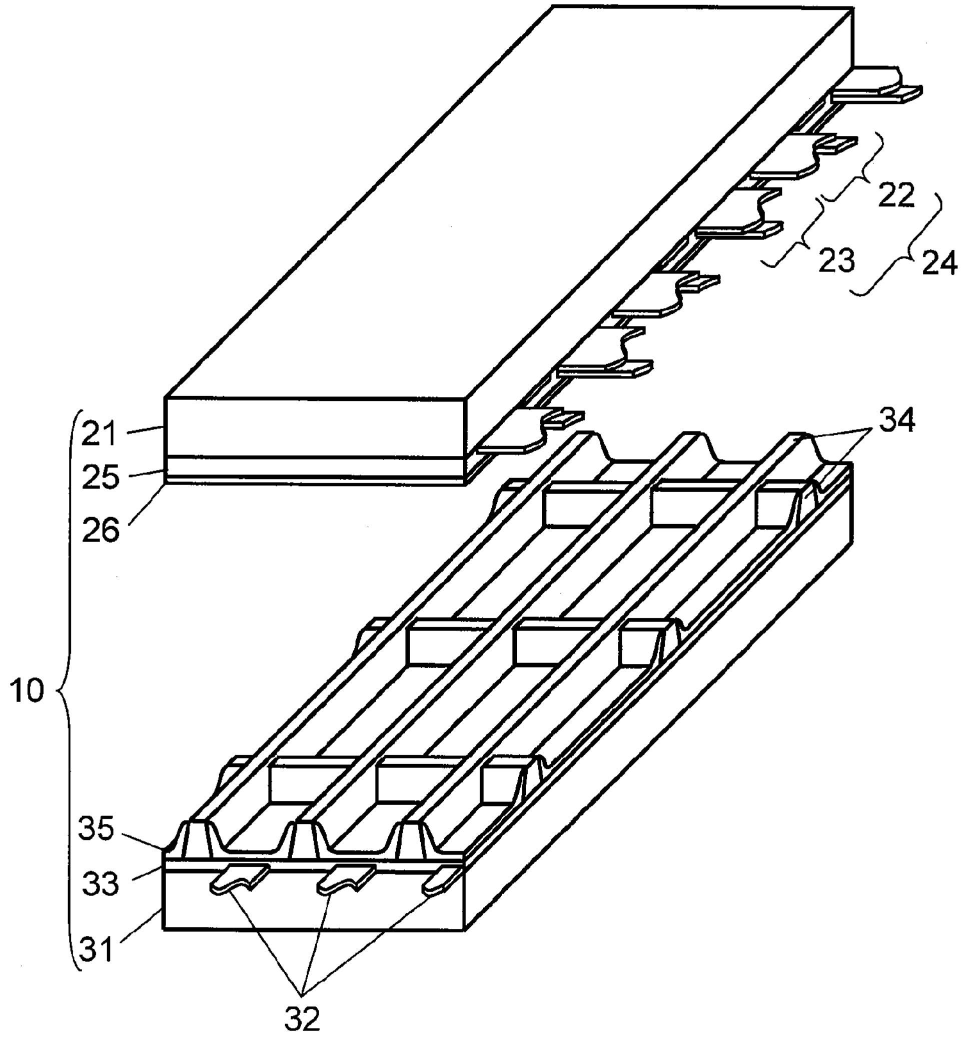
FIG. 1 is a perspective exploded view showing a structure of a panel in preferred embodiment 1 of the present invention.

10 Panel
22 Scan electrode
23 Sustain electrode
24 Display electrode pair
32 Data electrode
41 Image signal processing circuit
42 Data electrode driving circuit
43 Scan electrode driving circuit
44 Sustain electrode driving circuit
45 Timing generating circuit
50 Scan pulse generating unit
53 Odd-number electrode output unit
54, 57 Switch
56 Even-number electrode output unit
60 (1) to 60 (n) Output unit
70 (1) to 70 (n), 80 (1) to 80 (n)Switching element
92, 93 Leading wire
97, 98 Electrode terminal
100 Plasma display device

DETAILED DESCRIPTION OF THE PREFERRED EMBODIMENTS

The method for driving a panel and the plasma display device in preferred embodiments of the present invention are described below while referring to the accompanying drawings.

Preferred Embodiment 1

FIG. 1 is a perspective exploded view showing a structure of panel 10 in preferred embodiment 1 of the present invention. On front substrate 21 made of glass, a plurality of display electrode pairs 24 consisting of scan electrode 22 and sustain electrode 23 are formed. Dielectric layer 25 is formed so as to cover scan electrode 22 and sustain electrode 23. Protective layer 26 is formed on dielectric layer 25. On rear substrate 31, a plurality of data electrodes 32 are formed, and dielectric layer 33 is formed so as to cover data electrodes 32, and further barrier ribs 34 in a shape of mesh are formed thereon. On the lateral side of barrier ribs 34 and on dielectric layer 33, phosphor layers 35 emitting in red color, green color, and blue color are provided.

Front substrate 21 and rear substrate 31 are disposed oppositely so that display electrode pairs 24 and data electrodes 32 may intersect with each other across a small discharge space, and their outer circumference is sealed with a sealing material such as glass frit. The discharge space is packed with discharge gas such as mixed gas of neon and xenon. The discharge space is divided into a plurality of sections by means of barrier ribs 34, and discharge cells are formed at intersecting points of display electrode pairs 24 and data electrodes 32. These discharge cells discharge and emit lights, and an image is formed.

The structure of panel 10 is not limited to the example given above, but, for example, stripe-shaped barrier ribs may be provided.

Figure 2:
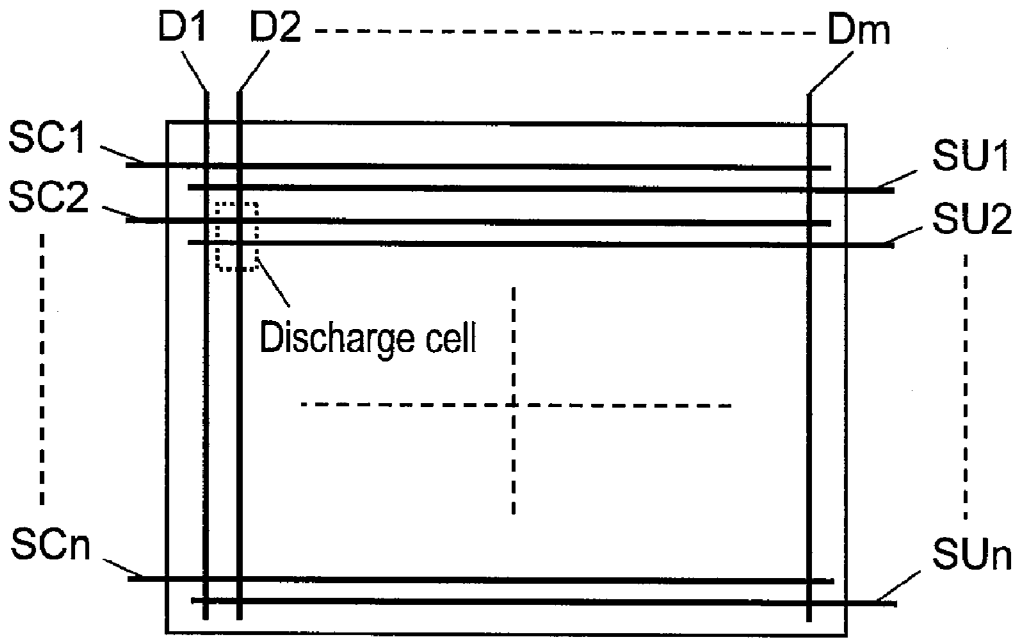
FIG. 2 is an electrode layout diagram of the panel in preferred embodiment 1 of the present invention.

FIG. 2 is an electrode layout diagram of panel 10 in preferred embodiment 1 of the present invention. On panel 10, n pieces (n being an even number) of scan electrodes SC1 to SCn (scan electrodes 22 in FIG. 1) and n pieces of sustain electrodes SU1 to SUn (sustain electrodes 23 in FIG. 1), both long in the row direction, are arrayed, and m pieces of data electrodes D1 to Dm (data electrodes 32 in FIG. 1), long in the column direction, are arrayed. Discharge cells are formed at intersecting points of a pair of scan electrode SCi (i=1 to n) and sustain electrode SUi and one data electrode Dj (j=1 to m), and m×n pieces of discharge cells are formed in the discharge space.

In preferred embodiment 1, n is an even number, and odd-number scan electrodes SC1, SC3, . . . , SCn−1 are supposed to belong to a first scan electrode group, and even-number number scan electrodes SC2, SC4, . . . , SCn are supposed to belong to a second scan electrode group.

Figure 3:
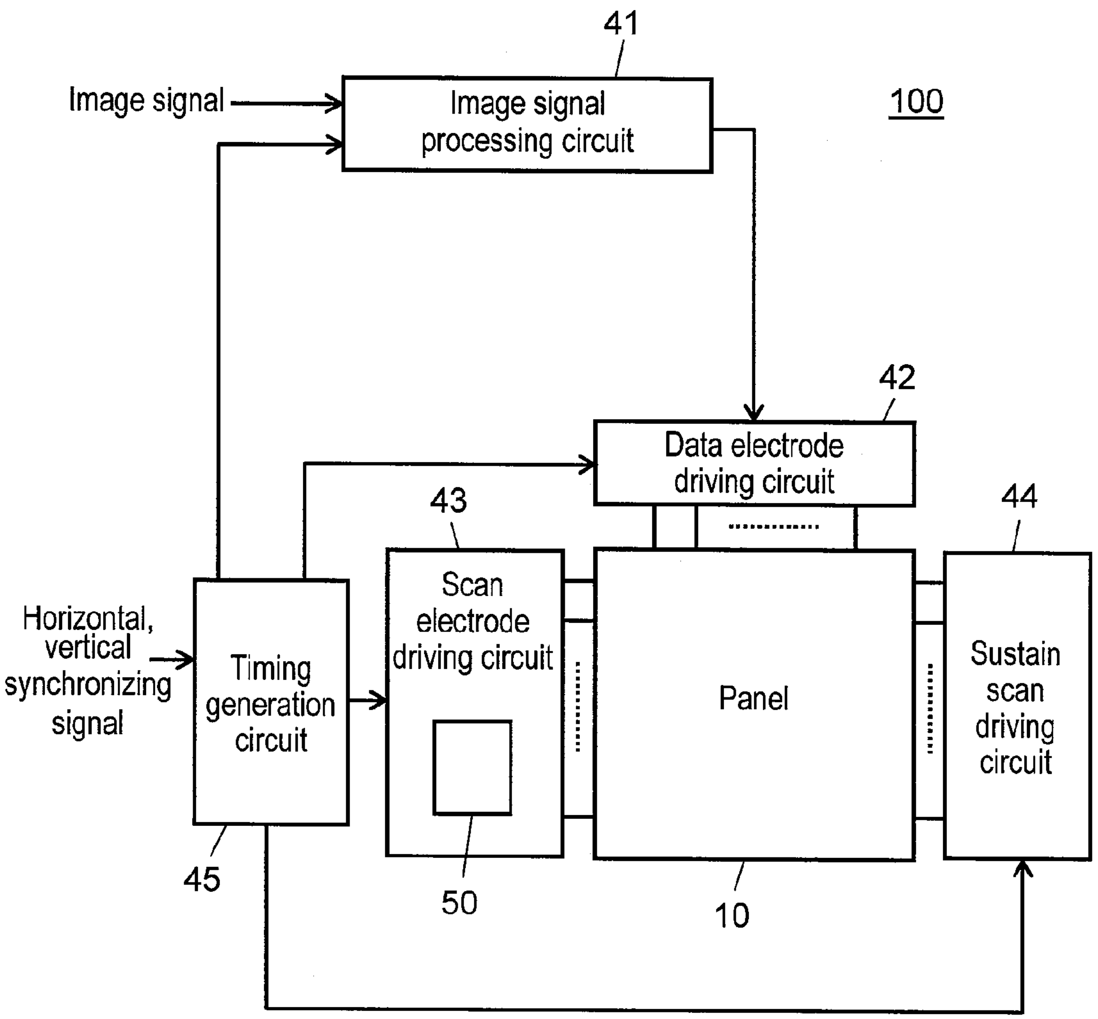
FIG. 3 is a circuit block diagram of a plasma display device in preferred embodiment 1 of the present invention.

FIG. 3 is a circuit block diagram of plasma display device 100 in preferred embodiment 1 of the present invention. Plasma display device 100 includes panel 10, image signal processing circuit 41, data electrode driving circuit 42, scan electrode driving circuit 43, sustain electrode driving circuit 44, timing generation circuit 45, and a power source unit (not shown) for supplying necessary power to each circuit block.

Image signal processing circuit 41 converts the received image signal into image data showing light emission or no emission in each subfield. Data electrode driving circuit 42 converts the image data of each subfield into signals corresponding to data electrodes D1 to Dm, and drives data electrodes D1 to Dm.

Timing generation circuit 45 generates various timing signals for controlling the operation of each circuit block on the basis of the horizontal synchronizing signal and vertical synchronizing signal, and supplies to each circuit block. Scan electrode driving circuit 43 has scan pulse generating unit 50 for generating various voltages and scan pulses to be applied to scan electrodes SC1 to SCn in the address period, and drives the scan electrodes SC1 to SCn according to the timing signals. Sustain electrode driving circuit 44 drives sustain electrodes SU1 to SUn according to the timing signals.

The driving voltage waveform for driving panel 10 and its operation are explained. Plasma display device 100 operates on the subfield method, that is, one field period is divided into a plurality of subfields, and controls light emission and no emission of each discharge cell in every subfield, and thereby realizing gradation display. Each subfield has an initializing period, an address period, and a sustain period. In the initializing period, initializing discharge is generated, and a wall charge necessary for subsequent address discharge is formed on each electrode.

In the address period, the discharge cell for emitting light selectively generates address discharge, and forms a wall charge. In the sustain period, the discharge cell having generated address discharge generates sustain discharge, and emits light.

In preferred embodiment 1, the address period is divided into a first address period for applying scan pulses sequentially to the individual scan electrodes belonging to the first scan electrode group, and a second address period for applying scan pulses sequentially to the individual scan electrodes belonging to the second scan electrode group. The scan electrodes belonging to the first scan electrode group are odd-number scan electrodes SC1, SC3, . . . , SCn−1, and the scan electrodes belonging to the second scan electrode group are even-number scan electrodes SC2, SC4, . . . , SCn. Hereinafter, the first address period is called "the odd-number period" and the second address period is called "the even-number period".

Figure 4:
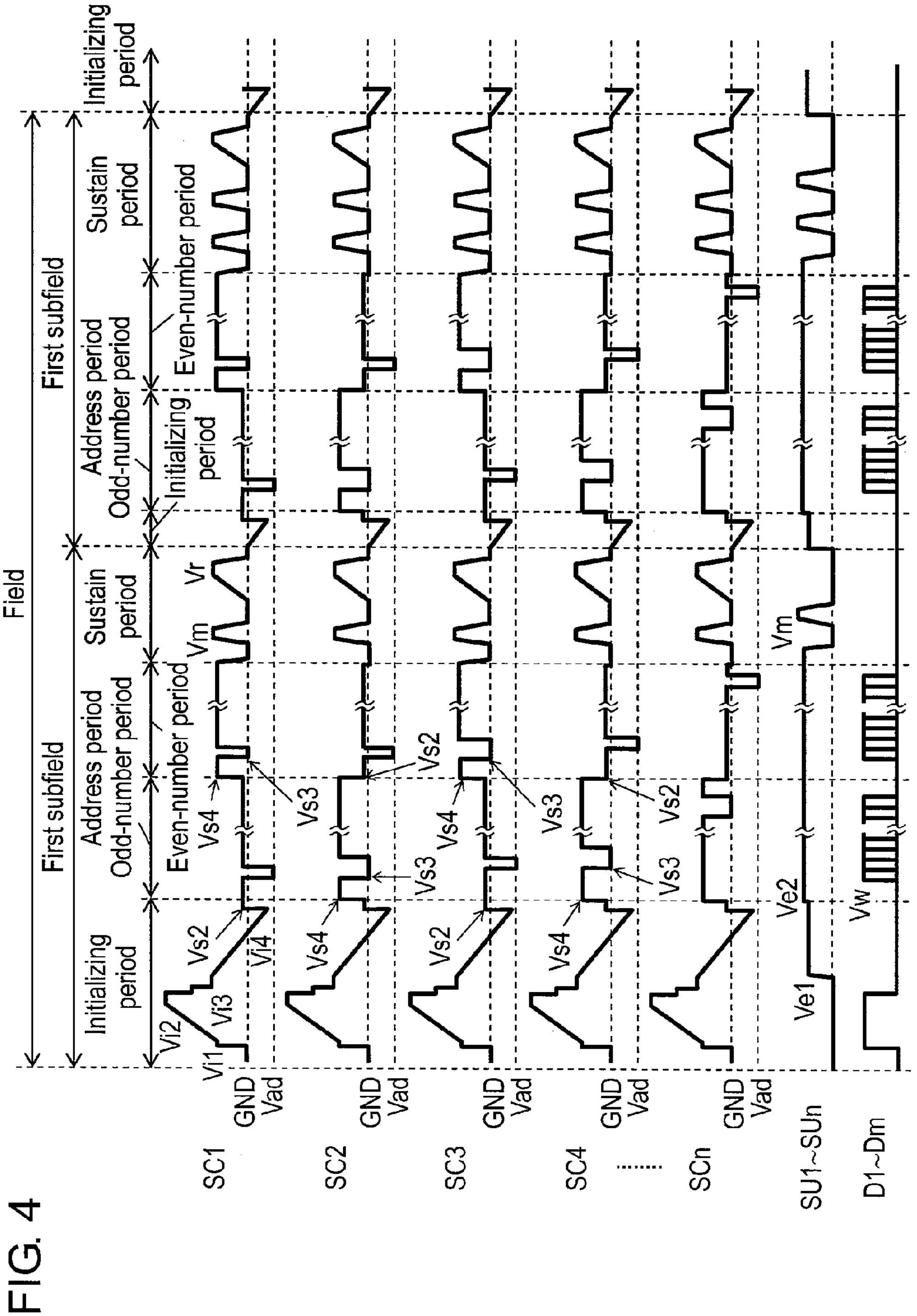
FIG. 4 is a driving voltage waveform diagram to be applied to each electrode of the panel in preferred embodiment 1 of the present invention.

The driving voltage waveform for driving panel 10 and its operation are explained. FIG. 4 is a driving voltage waveform diagram to be applied to each electrode of panel 10 in preferred embodiment 1 of the present invention. One field period is composed of, for example, 10 subfields, and the driving voltage waveform of two subfields is shown in FIG. 4.

In a first half of initializing period of first subfield, an address pulse voltage Vw is applied to data electrodes D1 to Dm, and 0 V is applied to sustain electrodes SU1 to SUn. On scan electrodes SC1 to SCn, a ramp waveform voltage is applied, which ascends from voltage Vi1 lower than breakdown start voltage applied to sustain electrodes SU1 to SUn slowly toward voltage Vi2 exceeding the breakdown start voltage. During the ascending time of this ramp waveform voltage, a very small initializing discharge occurs between scan electrodes SC1 to SCn and sustain electrodes SU1 to SUn, and data electrodes D1 to Dm. As a result, negative wall voltages are accumulated on scan electrodes SC1 to SCn, while positive wall voltages are accumulated on data electrodes D1 to Dm and sustain electrodes SU1 to SUn. Herein, wall voltages on the electrodes are voltages generated by wall charges accumulated on the dielectric layers, protective layer and phosphor layers for covering the electrodes.

In a second half of initializing period, a positive voltage Ve1 is applied to sustain electrodes SU1 to SUn. On scan electrodes SC1 to SCn, a ramp waveform voltage is applied, which descends from voltage Vi3 lower than breakdown start voltage applied to sustain electrodes SU1 to SUn slowly toward voltage Vi4 exceeding the breakdown start voltage. During this time, a very small initializing discharge occurs between scan electrodes SC1 to SCn and sustain electrodes SU1 to SUn, and data electrodes D1 to Dm. As a result, the negative wall voltages on scan electrodes SC1 to SCn and the positive wall voltages on sustain electrodes SU1 to SUn are weakened, and the positive wall voltages on data electrodes D1 to Dm are adjusted to values suited to address operation.

In some of the subfields for composing one field, the first half of initializing period may be omitted. In such a case, the initializing operation is selectively executed on the discharge cell having executed sustain discharge in the immediately preceding subfield. In FIG. 4, the driving voltage waveforms are shown for executing the initializing operation in the first half and the second half in the initializing period of the first subfield, and for executing the initializing operation in the second half only in the initializing period of the second and subsequent subfields.

In the odd-number period in the subsequent address period, voltage Ve2 is applied to sustain electrodes SU1 to SUn. Second voltage Vs2 is applied to odd-number scan electrodes SC1, SC3, . . . , SCn−1, and fourth voltage Vs4 is applied to even-number scan electrodes SC2, SC4, . . . , SCn. Herein, fourth voltage Vs4 is higher than second voltage Vs2.

Scan pulse voltage Vad is applied for applying a negative scan pulse to first scan electrode SC1. Positive address pulse voltage Vw is applied to data electrode Dk (k=1 to m) of the discharge cell for emitting light on the first row out of data electrodes D1 to Dm. At this time, in preferred embodiment 1, third voltage Vs3 lower than fourth voltage Vs4 is applied to the scan electrode adjacent to scan electrode SC1, that is, second scan electrode SC2. This is intended to prevent application of an excessive voltage difference between adjacent scan electrode SC1 and scan electrode SC2.

As a result, the voltage difference at the intersection of data electrode Dk of the discharge cell provided with address pulse voltage Vw and scan electrode SC1 becomes the sum of the difference of external applied voltages (Vw−Vad) and the difference of wall voltage on data electrode Dk and wall voltage on scan electrode SC1, and exceeds the breakdown start voltage. Consequently, address discharge occurs between data electrode Dk and scan electrode SC1, and between sustain electrode SU1 and scan electrode SC1, and a positive wall voltage is accumulated on scan electrode SC1, a negative wall voltage is accumulated on sustain electrode SUI, and a negative wall voltage is also accumulated on data electrode Dk. Thus, on the discharge cell for emitting light on the first row, address discharge occurs, and the address operation is executed, that is, wall voltages are accumulated on the electrodes. On the other hand, the voltage at the intersection between data electrode D1 to Dm not provided with address pulse voltage Vw and scan electrode SC1 does not exceed the breakdown start voltage, and hence address discharge does not occur.

Next, scan pulse voltage Vad is applied to third scan electrode SC3, and positive address pulse voltage Vw is applied to data electrode Dk of the discharge cell for emitting light on the third row out of data electrodes D1 to Dm. At this time, third voltage Vs3 is applied also to second scan electrode SC2 and fourth scan electrode SC4 adjacent to scan electrode SC3. Consequently, address discharge occurs between data electrode Dk of this discharge cell and scan electrode SC3, and between sustain electrode SU3 and scan electrode SC3, and address operation occurs for accumulating wall voltages on the electrode.

Then, on odd-number scan electrodes SC5, SC7, . . . , SCn−1, similarly, address operation is executed. Third voltage Vs3 is also applied to even-number scan electrode SCp and scan electrode SCp+2 adjacent to odd-number scan electrode SCp+1 (p=even number, $1<p<n$) of the address operation.

In the subsequent even-number period, second voltage Vs2 is applied to even-number scan electrodes SC2, SC4, . . . , SCn, and fourth voltage Vs4 is applied to odd-number scan electrodes SC1, SC3, . . . , SCn−1.

Scan pulse voltage Vad is applied for applying a negative scan pulse to second scan electrode SC2, and positive address pulse Vw is applied to data electrode Dk of the discharge cell for emitting light on the second row out of data electrodes D1 to Dm. At this time, third voltage Vs3 lower than fourth voltage Vs4 is applied to the scan electrodes adjacent to second scan electrode SC2, that is, first scan electrode SC1 and third scan electrode SC3.

As a result, the voltage difference at the intersection of data electrode Dk of the discharge cell and scan electrode SC2 exceeds the breakdown start voltage, and address discharge occurs in the discharge cell for emitting light on the second row, and the address operation is executed, and the wall voltage is accumulated on each electrode.

Consequently, scan pulse voltage Vad is applied to fourth scan electrode SC4, and positive address pulse Vw is applied to data electrode Dk of the discharge cell for emitting light on the fourth row. At this time, third voltage Vs3 is applied to third scan electrode SC3 and fifth scan electrode SC5 adjacent to scan electrode SC4. As a result address discharge occurs in this discharge cell.

Similarly, thereafter, address operation is executed on even-number scan electrode SC6, SC8, . . . , Scn. At this time, third voltage Vs3 is applied to odd-number scan electrode SCp−1 and scan electrode SCp+1 adjacent to even-number scan electrode SCp for address operation.

In the subsequent substain period, first, positive sustain pulse voltage Vm is applied to scan electrodes SC1 to SCn, and 0 V is applied to sustain electrodes SU1 to SUn. As a result, in the discharge cell having caused address discharge, the voltage difference on scan electrode SCi and sustain electrode SUi becomes the sum of sustain pulse electrode Vm and the difference between the wall voltage on scan electrode SCi and the wall voltage on sustain electrode SUi, and exceeds the breakdown start voltage. Hence, sustain discharge occurs between scan electrode SCi and sustain electrode SUi, and phosphor layer 35 emits light by the ultraviolet ray generated at this time. As a result, a negative wall voltage is accumulated on scan electrode SCi, and a positive wall voltage is accumulated on sustain electrode SUi. Further, a positive wall voltage is accumulated also on data electrode Dk. On the discharge cell not causing address discharge in the address period, sustain discharge does not occur, and the wall voltage at the end of the initializing period is maintained.

Successively, 0 V is applied to scan electrodes SC1 to SCn, and sustain pulse voltage Vm is applied to sustain electrodes SU1 to SUn. As a result, in the discharge cell having caused sustain discharge, the voltage difference between sustain electrode SUi and scan electrode SCi exceeds the breakdown start voltage, and hence sustain discharge occurs again between sustain electrode SUi and scan electrode SCi. Thus, a negative wall voltage is accumulated on sustain electrode SUi, and a positive wall voltage is accumulated on scan electrode SCi. Similarly thereafter, in scan electrodes SC1 to SCn and sustain electrodes SU1 to SUn, sustain pulses are applied alternately in the number corresponding to the luminance weight, and a potential difference is given between electrodes of display electrode pairs 24, so that the sustain discharge continues in the discharge cell having caused address discharge in the address period.

In the final stage of sustain period, a ramp waveform voltage ascending slowly toward voltage Vr is applied to scan electrodes SC1 to SCn, and while the positive wall voltage remains on data electrode Dk, the wall voltage on scan electrode SCi and sustain electrode SUi is erased. Thus, the sustain operation in the sustain period is over.

The detailed structure of scan pulse generating unit 50 is explained. In preferred embodiment 1, it is explained that the difference between second voltage Vs2 and scan pulse voltage Vad is supposed to be equal to the difference between fourth voltage Vs4 and third voltage Vs3. This voltage difference is called Vscn hereinafter. That is, (Vs2−Vad)=(Vs4−Vs3)=Vscn.

Figure 5:
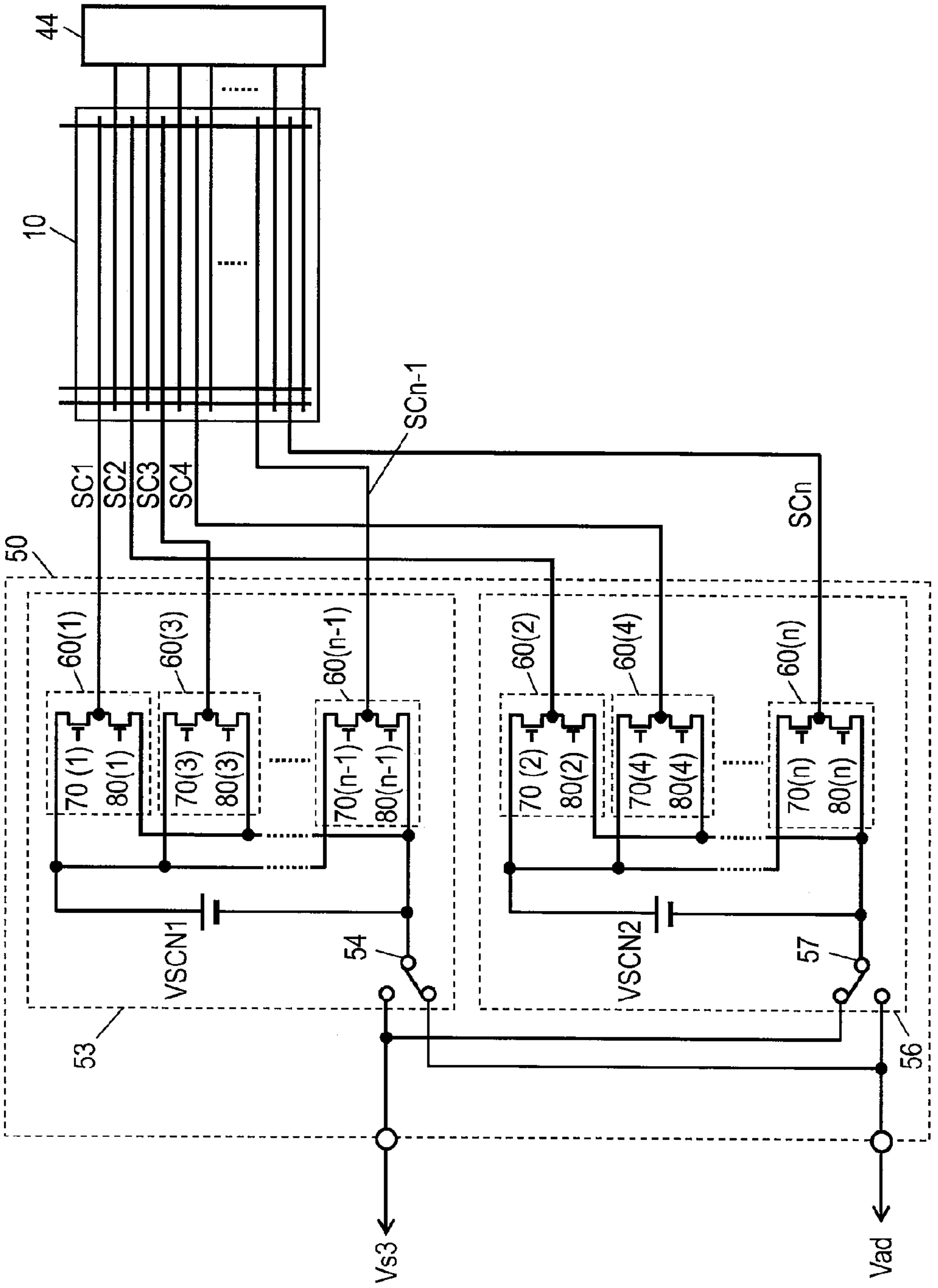
FIG. 5 is a circuit diagram showing a configuration of a scan pulse generating unit of the plasma display device in preferred embodiment 1 of the present invention.

FIG. 5 is a circuit diagram showing a configuration of scan pulse generating unit 50 of plasma display device 100 in preferred embodiment 1 of the present invention. FIG. 5 also shows panel 10 and sustain electrode driving circuit 44. Scan pulse generating unit 50 includes odd-number electrode output unit 53 for issuing driving voltages to be applied to odd-number scan electrodes SC1, SC3, . . . , SCn−1, and even-number electrode output unit 56 for issuing driving voltages to be applied to even-number scan electrodes SC2, SC4, . . . , SCn. The circuit for generating driving voltage waveforms to be applied in the initializing period and the sustain period is omitted.

Odd-number electrode output unit 53 includes floating power source VSCN1 of voltage Vscn, switch 54, and output units 60 (1), 60 (3), . . . , 60 (n−1). Switch 54 connects the low voltage side of floating power source VSCN1 to scan pulse voltage Vad or third voltage Vs3. Output units 60 (1), 60 (3), . . . , 60 (n−1) apply the low voltage side voltage or high voltage side voltage of floating power source VSCN1 to odd-number scan electrodes SC1, SC3, . . . , SCn−1. Output unit 60 (1) includes switching element 70 (1) for issuing the high voltage side voltage of floating power source VSCN1, and switching element 80 (1) for issuing the low voltage side voltage of floating power source VSCN1. Output unit 60 (3) also has switching element 70 (3) and switching element 80 (3). Output units 60 (5), 60 (7), . . . , 60 (n−1) are similarly composed.

Even-number electrode output unit 56 includes floating power source VSCN2 of voltage Vscn, switch 57, and output units 60 (2), 60 (4), . . . , 60 (n). Switch 57 connects the low voltage side of floating power source VSCN2 to scan pulse voltage Vad or third voltage Vs3. Output units 60(2), 60 (4), . . . , 60(n) apply the low voltage side voltage or high voltage side voltage of floating power source VSCN2 to even-number scan electrodes SC2, SC4, . . . , SCn. Output unit 60 (2) includes switching element 70 (2) for issuing the high voltage side voltage of floating power source VSCN2, and switching element 80 (2) for issuing the low voltage side voltage of floating power source VSCN2. Output units 60 (4), 60 (6), . . . , 60 (n) are similarly composed.

Power source VSCN1, power source VSCN2 may be composed by using, for example, DC-DC converter or the like, but may be easily composed by using a bootstrap circuit having diode and capacitor. In preferred embodiment 1, since the voltages of floating power source SCN1 and floating power source SCN2 are both voltage Vscn, second voltage Vs2 is (Vad+Vscn), and fourth voltage Vs4 is (Vs3+Vscn). Voltage Vad is −140 V, voltage Vscn is 150 V, and third voltage Vs3 is 0 V. However, these voltages are merely examples, and may be set appropriately depending on the panel characteristics or the like.

Figure 6:
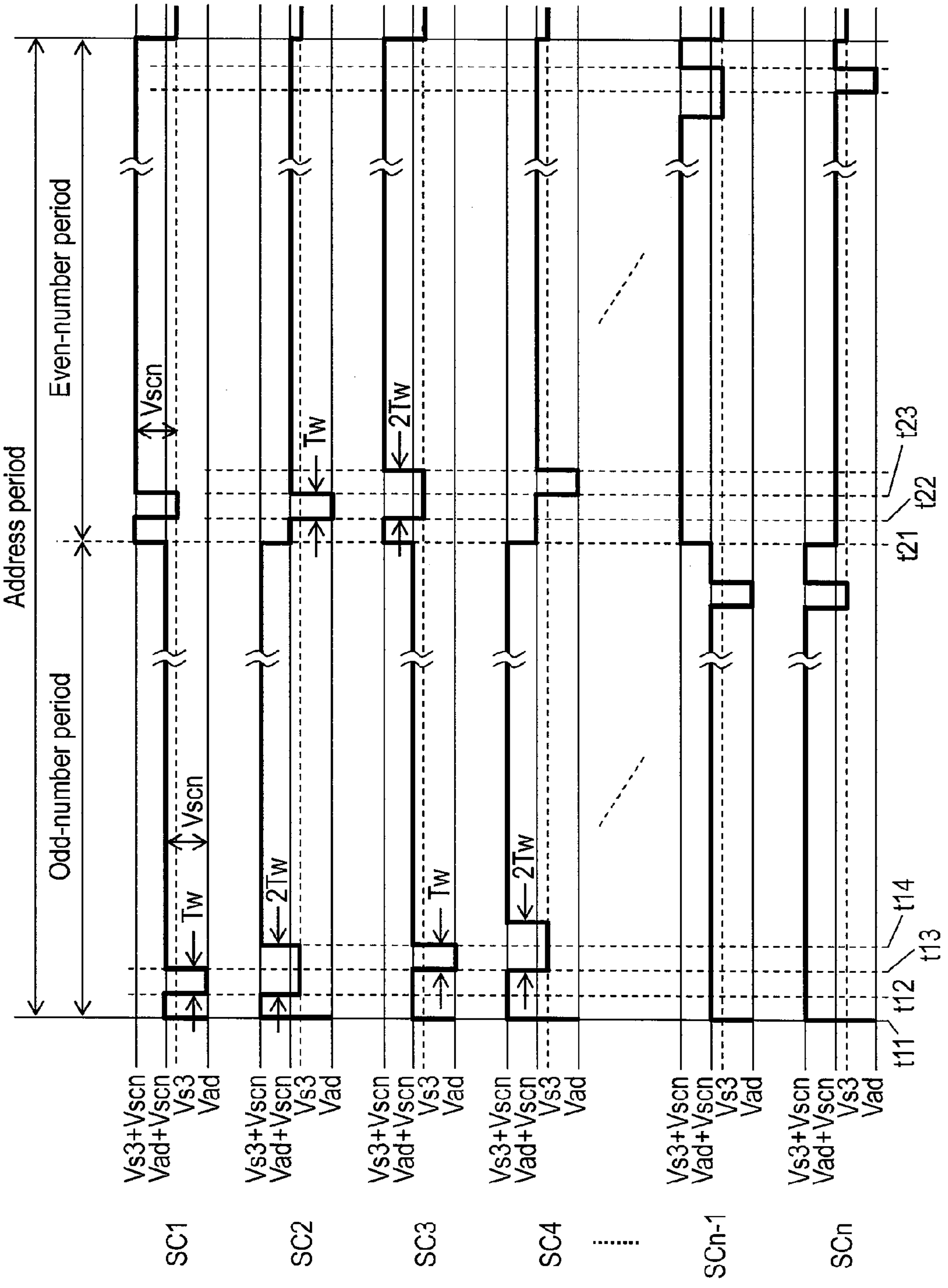
FIG. 6 is a diagram of driving voltage waveform to be applied to scan electrode in address period in preferred embodiment 1 of the present invention.

The detail of operation of scan pulse generating unit 50 in the address period is explained. FIG. 6 is a diagram of driving voltage waveform to be applied to scan electrodes SC1 to SCn in address period in preferred embodiment 1 of the present invention.

At time t11 at the beginning of odd-number period, switch 54 of odd-number electrode output unit 53 is connected to scan pulse voltage Vad, and turns on switching elements 70 (1), 70 (3), . . . , 70 (n−1) of output units 60 (1), 60 (3), . . . , 60 (n−1), and turns off switching elements 80 (1), 80 (3), . . . , 80 (n−1), and applies second voltage (Vad+Vscn) to odd-number scan electrodes SC1, SC3, . . . , SCn−1. Switch 57 of even-number electrode output unit 56 is connected to third voltage Vs3, and turns on switching elements 70 (2), 70 (4), . . . , 70 (n) of output units 60 (2), 60 (4), 60(6), . . . , 60 (n), and turns off switching elements 80 (2), 80 (4), . . . , 80 (n), and applies fourth voltage (Vs3+Vscn) to even-number scan electrodes SC2, SC4, SCn.

Next, at time t12, switching element 70 (1) of output unit 60 (1) is turned off, and switching element 80 (1) is turned on, and scan pulse voltage Vad is applied to scan electrode SC1. Further, switching element 70 (2) of output unit 60 (2) is turned off, and switching element 80 (2) is turned on, and third voltage Vs3 is applied to scan electrode SC2. By driving in this manner, scan pulse voltage Vad is applied to scan electrode SC1, and the voltage difference from scan electrode SC2 adjacent to scan electrode SC1 can be kept at a low value (Vs3−Vad).

At time t13 later than time t12 by time Tw, switching element 70 (1) of output unit 60 (1) is turned on, and switching element 80 (1) is turned off, and switching element 70 (3) of output unit 60 (3) is turned off, and switching element 80 (3) is turned on, and scan pulse voltage Vad is applied to scan electrode SC3. Further, switching element 70 (4) of output unit 60 (4) is turned off, and switching element 80 (4) is turned on, and third voltage Vs3 is applied to scan electrode SC4. By driving in this manner, scan pulse voltage Vad is applied to scan electrode SC3, and the voltage differences from scan electrode SC2 and scan electrode SC4 adjacent to scan electrode SC3 can be kept at a low value.

At time t14 later than time t13 by time Tw, switching element 70 (3) of output unit 60 (3) is turned on, and switching element 80 (3) is turned off, and switching element 70 (5) of output unit 60 (5) is turned off, and switching element 80 (5) is turned on, and scan pulse voltage Vad is applied to scan electrode SC5. Further, switching element 70 (2) of output unit 60 (2) is turned on, and switching element 80 (2) is turned off, and switching element 70(6) of output unit 60(6) is turned off, and switching element 80(6) is turned on, and third voltage Vs3 is applied to scan electrode SC6. By driving in this manner, scan pulse voltage Vad is applied to scan electrode SC5, and the voltage differences from scan electrode SC4 and scan electrode SC6 adjacent thereto can be kept at a low value.

Driving similarly thereafter, scan pulse voltage Vad of pulse width Tw is sequentially applied to odd-number scan electrodes SC7, SC9, . . . , SCn−1. At this time, third voltage Vs3 is applied to even-number scan electrodes SCp and SCp+2 adjacent to odd-number scan electrode SCp+1, and the voltage difference is kept low between the scan electrode provided with scan pulse voltage Vad and its adjacent scan electrodes.

At time t21 in the subsequent even-number period, switch 54 of odd-number electrode output unit 53 is connected to third voltage Vs3, and turns on switching elements 70 (1), 70 (3), . . . , 70 (n−1) of output units 60 (1), 60 (3), . . . , 60 (n−1), and turns off switching elements 80 (1), 80 (3), . . . , 80 (n−1), and applies fourth voltage (Vs3+Vscn) to odd-number scan electrodes SC1, SC3, . . . , SCn−1. Switch 57 of even-number electrode output unit 56 is connected to scan pulse voltage Vad, and turns on switching elements 70 (2), 70 (4), . . . , 70 (n) of output units 60 (2), 60 (4), . . . , 60 (n), and turns off switching elements 80 (2), 80 (4), . . . , 80 (n), and applies second voltage (Vad+Vscn) to even-number scan electrodes SC2, SC4, . . . , SCn.

At time t22 later than time t21 by time Tw, switching element 70 (2) of output unit 60 (2) is turned off, and switching element 80 (2) is turned on, and scan pulse voltage Vad is applied to scan electrode SC2. Further, switching element 70 (1) of output unit 60 (1) and switching element 70 (3) of output unit 60 (3) are turned off, and switching element 80 (1) and switching element 80 (3) are turned on, and third voltage Vs3 is applied to scan electrode SC1 and scan electrode SC3. By driving in this manner, scan pulse voltage Vad is applied to scan electrode SC2, and the voltage difference from scan electrode SC1 and scan electrode SC3 adjacent thereto can be kept at a low potential difference (Vs3−Vad). Accordingly, discharge does not occur between scan electrode SC1 and scan electrode SC2, and between scan electrode SC2 and scan electrode SC3. In the odd-number scan electrodes other than scan electrode SC1 and scan electrode SC3, fourth voltage Vs4 higher than second voltage Vs2 and third voltage Vs3 is applied. Accordingly, in this period, the wall charge necessary for address operation is not decreased.

At time t23 later than time t22 by time Tw, switching element 70 (2) of output unit 60 (2) is turned on, and switching element 80 (2) is turned off, and switching element 70 (4) of output unit 60 (4) is turned off, and switching element 80 (4) is turned on, and scan pulse voltage Vad is applied to scan electrode SC4. Further, switching element 70 (1) of output unit 60 (1) is turned on, and switching element 80 (1) is turned off, switching element 70 (5) of output unit 60 (5) is turned off, and switching element 80 (5) is turned on, and third voltage Vs3 is applied to scan electrode SC3 and scan electrode SC5. By driving in this manner, the voltage difference can be kept low between scan electrode SC4 provided with scan pulse voltage Vad, and scan electrode SC3 and scan electrode SC5 adjacent thereto.

Driving similarly thereafter, scan pulse voltage Vad of pulse width Tw is sequentially applied to even-number scan electrodes SC6, SC8, . . . , SCn. At this time, third voltage Vs3 is applied to odd-number scan electrodes SCp−1 and SCp+1 adjacent to even-number scan electrode SCp, and the voltage difference is kept low between the scan electrode provided with scan pulse voltage Vad and its adjacent scan electrodes.

Figure 7:
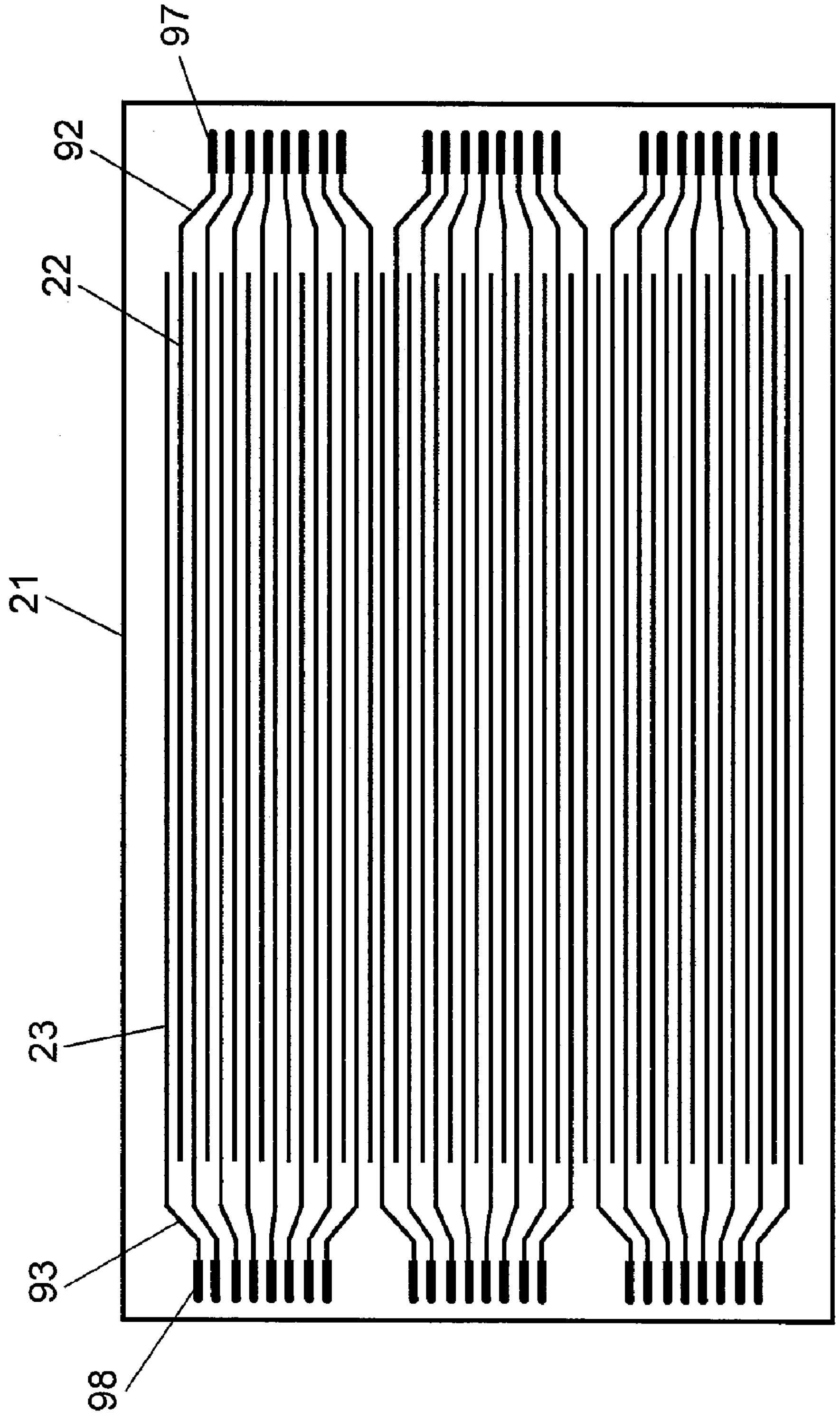
FIG. 7 is a schematic diagram showing configuration of scan electrodes, sustain electrodes, and their electrode terminals on the front substrate in preferred embodiment 1 of the present invention.

FIG. 7 is a schematic diagram showing configuration of scan electrodes 22, sustain electrodes 23, and their electrode terminals on front substrate 21 in preferred embodiment 1 of the present invention. Each one of scan electrodes 22 is connected to electrode terminal 97 for scan electrode provided in the right-side peripheral part outside of the image display region by means of outgoing wire 92. Similarly, each one of sustain electrodes 23 is connected to electrode terminal 98 for sustain electrode provided in the left-side peripheral part outside of the image display region by means of outgoing wire 93. These electrode terminals 97, 98 are grouped and disposed in a plurality for connecting a flexible wiring board for applying a driving voltage to each electrode of panel 10. In FIG. 7, 24 each of scan electrodes 22 and sustain electrodes 23, and 24 each of electrode terminals 97 for scan electrodes and electrode terminals 98 for sustain electrodes grouped by 8 pieces each are shown, but these numerical values are only for the purpose of ease of viewing the drawing. In preferred embodiment 1, actually, 1080 each of scan electrodes 22 and sustain electrodes 23 are provided, and electrode terminals 97 for scan electrodes are grouped by 134 pieces each or 136 pieces each.

Figure 8:
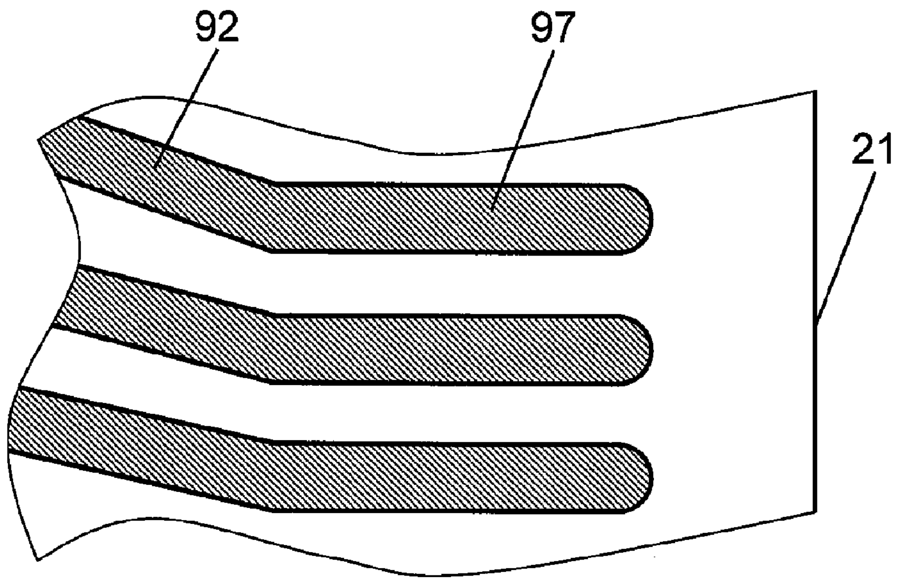
FIG. 8 is a magnified view showing the detail of electrode terminals in preferred embodiment 1 of the present invention.

FIG. 8 is a magnified view showing the detail of electrode terminals 97 in preferred embodiment 1 of the present invention, and is a view of electrode terminals 97 of front substrate 21 as seen from the top. In preferred embodiment 1, electrode terminals 97 for scan electrode are thin strips of, for example, 150 μm in width and 4 mm in length, and they are arranged at pitches of 390 μm. Thus, electrode terminals 97 have no design allowance for extending the intervals, dielectric breakdown may occur if an excessive voltage is applied between electrode terminals. Or when an excessive voltage is applied between electrode terminals for a long time, metal particles forming the electrodes are used to be moved to cause short-circuiting between electrode terminals, which is known as migration.

In preferred embodiment 1, however, as mentioned above, the difference in voltage between the scan electrode provided with scan pulse voltage Vad and scan electrodes adjacent thereto is a voltage of (Vs3−Vad), and large voltage difference is not applied between adjacent scan electrodes. Therefore, even in electrode terminals 97 of narrow intervals, dielectric breakdown or migration does not occur, and dielectric breakdown or migration does not occur between wirings of flexible wiring board or between wirings of circuit board.

In preferred embodiment 1, odd-number scan electrodes belong to the first scan electrode group, and even-number scan electrodes belong to the second scan electrode group. Accordingly, if a slight error occurs in the driving voltage waveform due to difference in arrangement of circuit parts or wirings between odd-number electrode output unit 53 and even-number electrode output unit 56, since the odd-number scan electrodes and even-number scan electrodes are arrayed alternately, contour does not occur in the boundary.

In preferred embodiment 1, in both first address period and second address period, it is explained that the scan electrodes belonging to the scan electrode group provided with scan pulses are sequentially provided with scan pulses shifting from second voltage Vs2 higher than scan pulse voltage to scan pulse voltage Vad and shifting again to second voltage Vs2. The scan electrodes belonging to the scan electrode group not provided with scan pulses are provided with either third voltage Vs3 higher than scan pulse voltage Vad, or fourth voltage Vs4 higher than second voltage Vs2 and third voltage Vs3, and provided with third voltage Vs3 at least in the period when scan pulse voltage Vad is applied to adjacent scan electrodes. However, preferred embodiment 1 is not limited to this operation alone. For example, this driving method may be applied only in the first address period.

In preferred embodiment 1, the scan electrodes belonging to the scan electrode group not provided with scan pulses are provided with third voltage Vs3 only while scan pulse voltage Vad is applied to the adjacent scan electrodes, and provided with fourth voltage Vs4 in other period. The present invention is not limited to this example alone. Other preferred embodiment is explained below.

Preferred Embodiment 2

Figure 9:
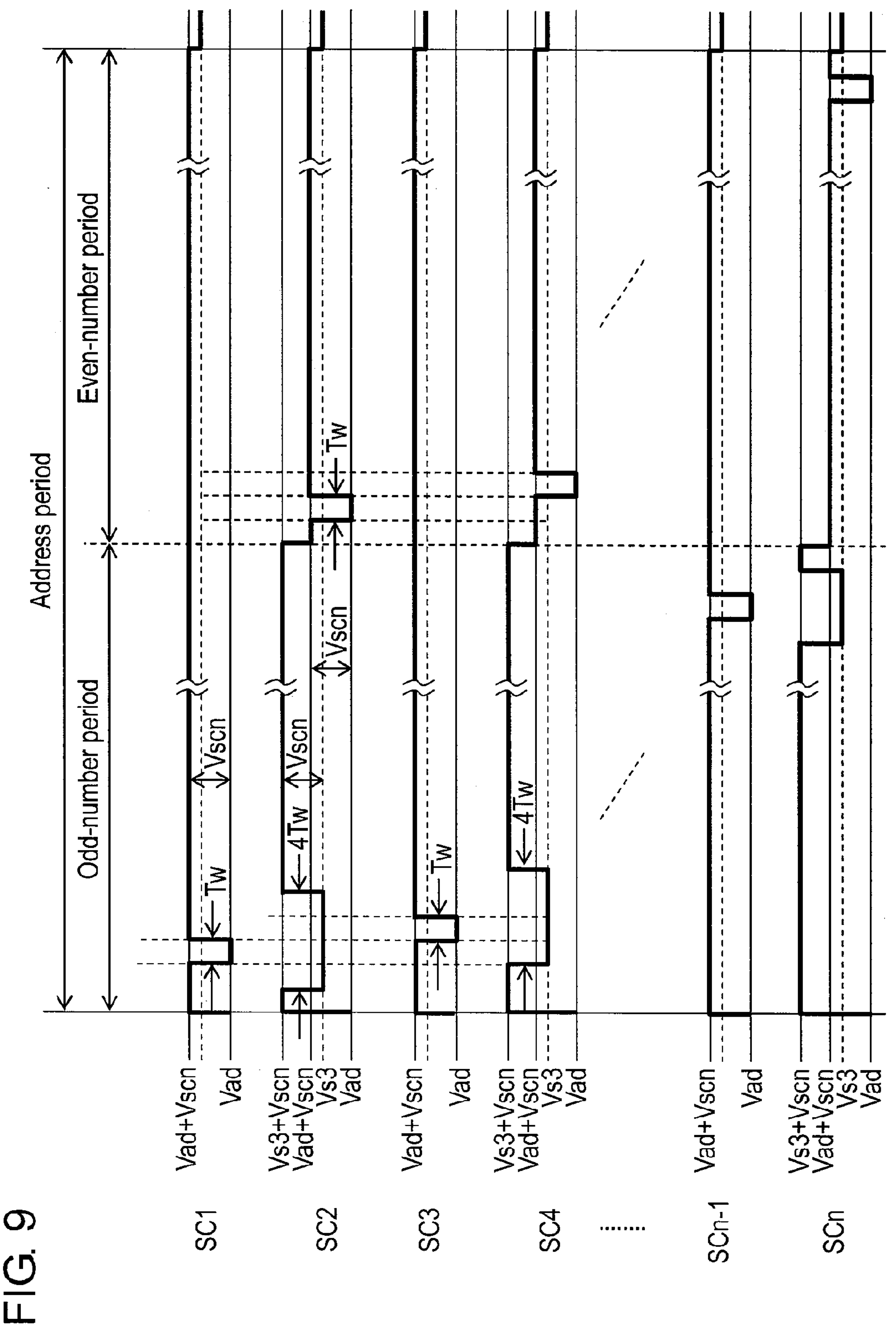
FIG. 9 is a diagram showing driving voltage waveforms to be applied to scan electrodes in address period in preferred embodiment 2 of the present invention.

FIG. 9 is a diagram showing driving voltage waveforms to be applied to scan electrodes SC1 to SCn in address period in preferred embodiment 2 of the present invention. In the odd-number period as the first address period, the scan electrodes belonging to the scan electrode group provided with scan pulses are sequentially provided with scan pulses shifting from second voltage Vs2 higher than scan pulse voltage to scan pulse voltage Vad and shifting again to second voltage Vs2. The scan electrodes belonging to the scan electrode group not provided with scan pulses are provided with either third voltage Vs3 higher than scan pulse voltage Vad, or fourth voltage Vs4 higher than second voltage Vs2 and third voltage Vs3. In the time of 4Tw including at least the application time of scan pulse voltage Vad to the adjacent scan electrodes, third voltage Vs3 is applied, and the other time, fourth voltage Vs4 higher than second voltage Vs2 and third voltage Vs3 is applied.

In the even-number period as the second address period, switch 54 of odd-number electrode output unit 53 is kept connected to scan pulse voltage Vad, and switch 57 of even-number electrode output unit 56 is connected to scan pulse voltage Vad. Switching elements 70 (1) to 70 (n) are turned on, and switching elements 80 (1) to 80 (n) are turned off, and second voltage (Vad+Vscn) is applied to scan electrodes SC1 to SCn.

Later, switching element 70 (2) of output unit 60 (2) is turned off, and switching element 80 (2) is turned on, and scan pulse voltage Vad is applied to scan electrode SC2. After time Tw, switching element 70 (2) of output unit 60 (2)is turned on, and switching element 80 (2) is turned off, and switching element 70 (4) of output unit 60 (4) is turned off, and switching element 80 (4) is turned on, and scan pulse voltage Vad is applied to scan electrode SC4. Driving similarly thereafter, scan pulse voltage Vad of pulse width Tw is applied sequentially to even-number scan electrodes SC6, SC8, . . . , SCn.

By this driving method, too, voltage difference exceeding voltage Vscn is not applied to adjacent scan electrodes, and dielectric breakdown or migration does not occur. In the odd-number period, the address operation of odd-number scan electrodes has been already finished, if the wall charge of the odd-number scan electrodes is decreased in the even-number period, there is no fear of deterioration of image display quality.

FIG. 1, FIG. 2, FIG. 3, FIG. 4, FIG. 5, FIG. 7, FIG. 8 explained in preferred embodiment 1 are similar in preferred embodiment 2, and the detailed description is omitted.

In preferred embodiment 2, odd-number scan electrodes belong to the first scan electrode group, and even-number scan electrodes belong to the second scan electrode group. However, odd-number scan electrodes may belong to the second scan electrode group, and even-number scan electrodes may belong to the first scan electrode group. Or, in every field, the first scan electrode group and the second scan electrode group may be exchanged.

In the present invention, the number of subfields, the luminance weight of each subfield, or the time of pulse width T may not be limited to a specific numerical value. Specific numerical values given in preferred embodiment 1 and preferred embodiment 2 are only examples, and proper values may be determined depending on the panel characteristics or the specification of the plasma display device.

As clear from the description herein, the present invention presents a panel driving method capable of preventing decrease of wall charge and generating stable address discharge, without causing spark or short-circuiting or without deteriorating the image display quality.

According to the present invention, the voltages of two floating power sources may be equalized.

Industrial Applicability

The present invention is capable of preventing decrease of wall charge and generating stable address discharge, without causing spark or short-circuiting or without deteriorating the image display quality, and is hence very useful as panel driving method.

The invention claimed is:

1. A method for driving a plasma display panel, the plasma display panel having a plurality of scan electrodes, a plurality of sustain electrodes, and a plurality of data electrodes, wherein the plurality of scan electrodes are divided into a first scan electrode group and a second scan electrode group, one field period is composed of a plurality of subfields having a first address period for applying scan pulses sequentially to the scan electrodes belonging to the first scan electrode group, and a second address period for applying scan pulses sequentially to the scan electrodes belonging to the second scan electrode group, and at least in one of the first address period and the second address period:

applying to the scan electrodes belonging to the first scan electrode group pulses shifting between being held at a first voltage and being held at a second voltage higher than the first voltage, and applying to the scan electrodes belonging to the second scan electrode group pulses shifting between being held at a third voltage higher than the first voltage and lower than the second voltage, and being held at a fourth voltage higher than the second voltage, and wherein the third voltage is applied to the scan electrodes belonging to the second scan electrode group:

while the scan pulses are applied to the scan electrodes belonging to the first scan electrode group, and for a longer period of time than the scan pulses are applied to the scan electrodes belonging to the first scan electrode group.

2. The method for driving a plasma display panel of claim 1, wherein odd-number scan electrodes belong to the first scan electrode group and even-number scan electrodes belong to the second scan electrode group, or odd-number scan electrodes belong to the second scan electrode group and even-number scan electrodes belong to the first scan electrode group.

3. The method for driving a plasma display panel of claim 1, wherein the difference of the fourth voltage and the third voltage is equal to the difference of the second voltage and the first voltage.

4. A plasma display device comprising:

a plasma display panel having a plurality of scan electrodes, a plurality of sustain electrodes, and a plurality of data electrodes; and a scan electrode driving circuit:

the plurality of scan electrodes being divided into a first scan electrode group and a second scan electrode group, for applying sequentially scan pulses individually to the scan electrodes belonging to the first scan electrode group in first address period of subfields for composing one field period, and for applying sequentially scan pulses individually to the scan electrodes belonging to the second scan electrode group in second address period, wherein at least in one of the first address period and the second address period, the scan electrode driving circuit:

applies scan pulses shifting between being held at a first voltage and being held at a second voltage higher than the first voltage, to the scan electrodes belonging to the first scan electrode group, and applies scan pulses shifting between being held at a third voltage higher than the first voltage and lower than the second voltage, and being held at a fourth voltage higher than the second voltage, to the scan electrodes belonging to the second scan electrode group, and wherein the third voltage is applied to the scan electrodes belonging to the second scan electrode group:

while the scan pulses are applied to the scan electrodes belonging to the first scan electrode group, and for a longer period of time than the scan pulses are applied to the scan electrodes belonging to the first scan electrode group.

* * * * *

UNITED STATES PATENT AND TRADEMARK OFFICE

CERTIFICATE OF CORRECTION

PATENT NO. : 8,232,983 B2
APPLICATION NO. : 12/515349
DATED : July 31, 2012
INVENTOR(S) : Kenji Ogawa et al.

It is certified that error appears in the above-identified patent and that said Letters Patent is hereby corrected as shown below:

ON THE TITLE PAGE:

ITEM (56) REFERENCES CITED:

Page 2
At FOREIGN PATENT DOCUMENTS, delete duplicate entry “09-311661 A 12/1997”.

Page 2
At FOREIGN PATENT DOCUMENTS, delete duplicate entry “11-095717 A 4/1999”.

Signed and Sealed this
Eighteenth Day of December, 2012

David J. Kappos
*Director of the United States Patent and Trademark Office*